(12) United States Patent
Goodsitt et al.

(10) Patent No.: US 11,250,156 B2
(45) Date of Patent: Feb. 15, 2022

(54) SYSTEM FOR ENCRYPTING AND MAILING SENSITIVE INFORMATION

(71) Applicant: Capital One Services, LLC, McLean, VA (US)

(72) Inventors: Jeremy Edward Goodsitt, Champaign, IL (US); Austin Grant Walters, Savoy, IL (US); Fardin Abdi Taghi Abad, Champaign, IL (US); Vincent Pham, Champaign, IL (US); Anh Truong, Champaign, IL (US); Kenneth Taylor, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/726,801

(22) Filed: Dec. 24, 2019

(65) Prior Publication Data

US 2021/0192073 A1 Jun. 24, 2021

(51) Int. Cl.
G06F 21/62 (2013.01)
G06Q 10/08 (2012.01)

(52) U.S. Cl.
CPC ....... *G06F 21/6245* (2013.01); *G06Q 10/083* (2013.01); *G06Q 2220/10* (2013.01)

(58) Field of Classification Search
CPC .............. G06F 21/6245; G06Q 10/083; G06Q 2220/10
USPC .......................................................... 705/51
See application file for complete search history.

(56) References Cited

U.S. PATENT DOCUMENTS

| 5,493,106 A | 2/1996 | Hunter |
| 9,424,504 B2 | 8/2016 | Annamalai et al. |
| 9,697,447 B2 | 7/2017 | Schory et al. |
| 9,984,366 B1 | 5/2018 | Jammikunta et al. |
| 10,438,437 B1 | 10/2019 | Herrington |
| 10,559,964 B2 | 2/2020 | Kim et al. |
| 10,701,560 B1 | 6/2020 | Lerner |

(Continued)

FOREIGN PATENT DOCUMENTS

| EP | 1605396 A2 | 12/2005 |
| KR | 20170123561 A | 11/2017 |

OTHER PUBLICATIONS

Author Unknown, "Overlay a QR Code on an Image", URL:http://azonmobile.com/en/overlay-qr-code-on-an-image, Retrieved from Internet on Nov. 26, 2019, 5 pages.

*Primary Examiner* — James D Nigh
*Assistant Examiner* — Yin Y Choi
(74) *Attorney, Agent, or Firm* — Kacvinsky Daisak Bluni PLLC

(57) ABSTRACT

Various embodiments are generally directed to techniques to enhance the security of physically delivered packages, items, or products, including postal mail. An article of manufacture associated with the enhanced security of one or more embodiments of the present disclosure can include: a container with a postage, a physical medium in the container, wherein the physical medium contains a sender message embodied on the surface of the physical medium, and wherein the sender message comprises: an unencrypted message, and two or more encrypted portions of a plurality of terms of service, where each of the two or more encrypted portions of the plurality of terms of service are associated with a distinct barcode corresponding to each of the two or more encrypted portions.

18 Claims, 6 Drawing Sheets

(56) References Cited

U.S. PATENT DOCUMENTS

| | | |
|---|---|---|
| 2005/0061878 A1 | 3/2005 | Barenburg et al. |
| 2009/0144201 A1* | 6/2009 | Gierkink et al. |
| 2011/0243326 A1* | 10/2011 | Young et al. |
| 2012/0286031 A1 | 11/2012 | Rothschild |
| 2013/0031623 A1 | 1/2013 | Sanders |
| 2013/0246158 A1 | 9/2013 | Cannon et al. |
| 2014/0339312 A1 | 11/2014 | Simske et al. |
| 2014/0340723 A1 | 11/2014 | Matsubara et al. |
| 2015/0066778 A1 | 3/2015 | Jang et al. |
| 2015/0254902 A1 | 9/2015 | Macia et al. |
| 2015/0363681 A1 | 12/2015 | Simske et al. |
| 2016/0027042 A1 | 1/2016 | Heeter |
| 2016/0292428 A1 | 10/2016 | Brady et al. |
| 2016/0379330 A1 | 12/2016 | Powers et al. |
| 2017/0083802 A1* | 3/2017 | Chen et al. |
| 2018/0248878 A1 | 8/2018 | El-Moussa |
| 2019/0158468 A1* | 5/2019 | Duong et al. |
| 2020/0065637 A1 | 2/2020 | Gilbert et al. |

* cited by examiner

SYSTEM FOR ENCRYPTING AND MAILING SENSITIVE INFORMATION

BACKGROUND

The present embodiments relate to increasing the security associated with deliverable items, packages, and/or products, and more particularly to enhancing the security associated with deliverable mail.

The physical delivery of items, products, and/or packages, e.g. physical mail, by courier, including private and/or public postal or courier services is associated-inherently-with security vulnerabilities. For example, mail left in a mail box can be stolen, and sensitive information intended for the recipient can be appropriated by a third party with malicious intent.

Accordingly, there is a need to improve the security associated with the delivery of items, products, and/or packages.

SUMMARY

One aspect of the present disclosure includes a compute implemented method for encoding, decoding and/or facilitating physical delivery of a message. The method can include: identifying a recipient for transmission of a message from a sender, encrypting, utilizing at least one device associated with the sender, two or more portions of a sender message, each of the two or more portions of the sender message corresponding to a distinct scannable encryption mechanism located on a physical medium, where the physical medium contains an unencrypted message portion, and where the encryption is based at least in part on an identity information of a recipient, transmitting at least one decryption mechanism to a device associated with the recipient, where the decryption mechanism is based at least in part on the identity information of the recipient, and where the decryption mechanism is configured to decrypt the two or more encrypted portions of the sender message, transmitting the physical medium to the recipient, scanning, using the device associated with the recipient, each of the scannable encryption mechanisms, decrypting, based on the scanning and using the at least one decryption mechanism at the device associated with the recipient, each of the two or more portions of the sender message, sending a first confirmation message to the at least one device associated with the sender once a decryption of one of the two or more portions of the sender message is complete, and sending a second confirmation message to the at least one device associated with the sender once a decryption of another one of the two or more portions of the sender message is complete.

Another aspect of the present disclosure includes an apparatus configured to encode, decode and/or facilitate physical delivery of a message. The apparatus includes: a processor circuit, and a memory storing instructions which when executed by the processor circuit, cause the processor circuit to: transmit to a device of a recipient at least one decryption mechanism, where the at least one decryption mechanism is based at least in part on an identity information of the recipient, and where the at least one decryption mechanism is configured to decrypt, based on a scanning operation at the device of the recipient, two or more distinct scannable encryption mechanisms associated with two or more portions of a sender message, and where each of the two or more scannable encryption mechanisms are located on a surface of a portion of a physical mailing associated with a postal service, and where the surface of the portion of the physical mailing has both the two or more scannable encryption mechanisms and an unencrypted message portion, receive a first confirmation message once the decryption of one of the two or more portions of the sender message is complete, and receive a second confirmation message once the decryption of another one of the two or more portions of the sender message is complete.

Yet another aspect of the present disclosure includes an article of manufacture. The article of manufacture can include: a container with a postage, a physical medium in the container, where the physical medium contains a sender message embodied on the surface of the physical medium, and where the sender message includes: an unencrypted message, and two or more encrypted portions of a plurality of terms of service, where each of the two or more encrypted portions of the plurality of terms of service are associated with a distinct barcode corresponding to each of the two or more encrypted portions, where the encryption is based at least in part on an identity information of a recipient, where the barcode is configured for scanning by a device associated with the recipient, and where each barcode is associated with a token configured for decrypting the two or more encrypted portions.

DETAILED DESCRIPTION

Figure 1:
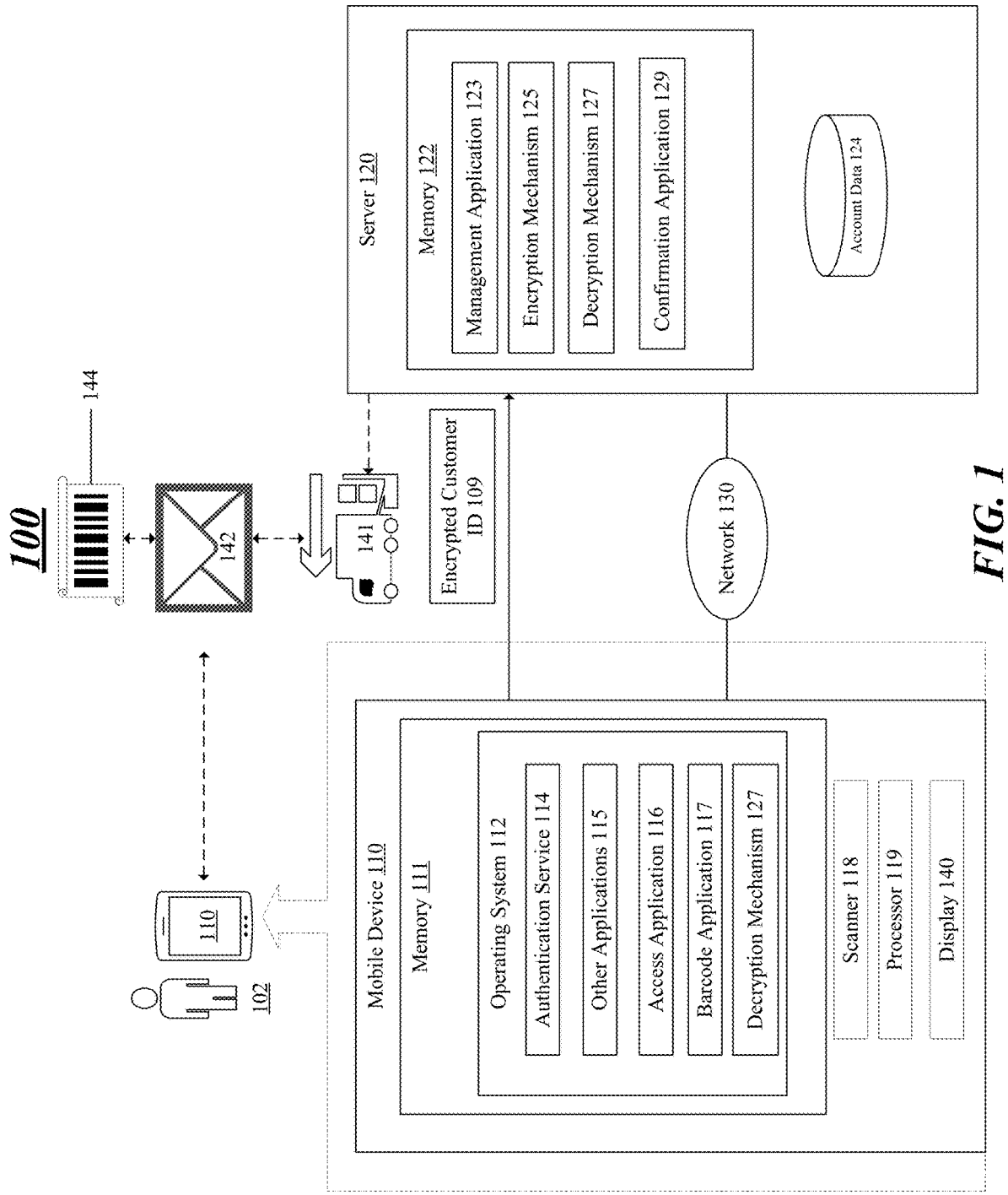
FIG. 1 illustrates an example of a system encrypting a physical delivery, decrypting a physical delivery, and/or delivering a physical delivery in accordance to at least one embodiment of the present disclosure.

Various embodiments are generally directed to techniques, systems, and processing flows to improve the security of a delivered package, item, or product to a recipient, where the delivered package can be physical postal mail. In various embodiments, the physical mail can contain an unencrypted message identifier, e.g. the name of the recipient with a postage stamp, without any additional information conveyable in a manner discernible to the naked eye. One or more portions of an actual message to be read by the recipient is encoded using any suitable encoding technique, e.g. a barcode associated with an encryption token that is unique to the recipient (e.g. a recipient device, such as a mobile phone or other suitable computer device). A host system associated with a sender can transmit a decryption mechanism to the recipient's device, such that the recipient can decrypt the one or more encrypted message portions, e.g. by scanning each encrypted portion with a camera associated with user device (e.g. mobile phone camera), and thereafter ascertain the message contents.

In various embodiments, in addition to enhancing the security of the deliverable mail by requiring that the recipient decrypt it before being able to read it, once the message is successfully decrypted, the host system can receive a confirmation that the message has been received and read. This enhances the security of the overall system by providing an additional confirmation mechanism that the mail has not been misappropriated or lost. Moreover, in various embodiments, where the encrypted message is associated with a specific message or message portion, e.g. a terms of service or a portion of a terms of service that carries particular importance (e.g. pricing of a product of service to be provided by the entity associated with the host system), the confirmation can serve as an efficient and secure mechanism to establish (and record) that the user/recipient has accepted and/or has been informed of the message or message portion (e.g. terms of service or terms of service portion) at issue. As such, in various embodiments, in addition to enhancing the security associated with the delivery of the mail, various embodiments also provide a secure technical mechanism to determine, prove and/or record that a user has received a message of particular importance (e.g. a message whose delivery carries legal significance).

Reference is now made to the drawings, wherein like reference numerals are used to refer to like elements. In the following description, for the purpose of explanation, numerous specific details are set forth in order to provide a thorough understanding thereof. It may be evident, however, that the novel embodiments can be practiced without these specific details. In other instances, well-known structures and devices are shown in block diagram form to facilitate a description thereof. The intention is to cover all modification, equivalents, and alternatives within the scope of the claims.

FIG. 1 depicts a schematic of an exemplary system 100, consistent with disclosed embodiments. As shown, the system 100 includes one or more mobile devices 110 that can interact with a user 102 (or users 102), and a server 120 via any suitable network 130 (e.g. internet, intranet, or any other suitable network). The mobile devices 110 are representative of any type of network-enabled computing devices, such as smartphones, tablet computers, wearable devices, laptops, portable gaming devices, and the like. The server 120 is representative of any type of computing device, such as a server, workstation, computer cluster, cloud computing platform, virtualized computing system, and the like.

As shown, a memory 111 of the mobile device 110 includes an instance of an operating system (OS) 112 and a processor 119 may execute one or more operations associated with the applications of the operating system (OS) 112 and/or perform any other suitable operation associated with processor activity, including comparison operations and executing instructions associated with memory 111. Example operating systems 112 include the Android® OS, iOS®, Linux®, and Windows® operating systems. As shown, the OS 112 includes one or more applications, including an authentication or verification application or service 114 (hereinafter referred to as "authentication application" for convenience), one or more other applications 115, one or more access applications 116, a barcode application 117, and a decryption mechanism 127.

The authentication application 114 is generally configured to perform one or more operations related to authenticating a user 102, including but not limited to determining when a user requires authentication for a transaction, service, or accessibility request, including the accessibility of information associated with a physically delivered item, package, or mailing (e.g. postal mail) and/or receiving credentials from one or more applications of a host device, e.g. server 120, related to authenticating a user. For example, the authentication application 114 may receive any suitable decryption mechanism 127 from a management application 123 of a server, where the decryption mechanism 127 can be related to an encryption mechanism 125 and can facilitate a decryption operation associated with the encryption operation of the encryption mechanism, e.g. such as a token for decrypting a barcode in association with a scan thereof and/or a key to decipher ciphered text. In various embodiments, the encryption mechanism 125 can be embodied in the form of one or more barcodes 144 associated with the one or more message segments of the contents of a postal mail 142 and/or ciphered text (e.g. based on any suitable cryptographic technique) associated with the one more message segments of the contents of the postal mail 142, and the authentication application 114 can receive a single, multiple, or continuous stream of decryption mechanisms 127 from the server 120 in order to decrypt the encryption associated with the encryption mechanism, e.g. the authentication application 114 can utilize a decryption token in relation with a scan of one or more barcodes 144 associated with one or more message segments and in association with a scan (e.g. facilitated by a barcode application 117 instructing a scanner 118 to scan a suitable barcode) of the same and/or a static or alternating cipher associated ciphered text. Once the authentication application 114 decrypts the encryption mechanism 125 associated with the one or more message segments, then the content associated with those segments can be presented to the user 102 in discernible form (e.g. visually, audibly, or otherwise). In various embodiments, once decrypted, the one or more message contents are displayed to the user 102 via the display 140 associated with mobile device 110.

In various embodiments, where the encryption/decryption scheme is a barcode, the authentication application 114 can instruct the barcode application 117 to facilitate the scanner 118 for scanning the one or more barcodes 144. In various embodiments, upon scanning, the authentication application 114 can fetch the decryption mechanism 127 provided by the server 120, and if the decryption mechanism 127 is suitable in relation to the one or more barcodes 144, then one or more message segments of the postal mail 142 can be decoded and viewed by the user 102.

In various embodiments, the authentication application 114 can send a confirmation back to the server 120 indicating that the one or more message segments associated with the postal mail 142 have been reviewed by the user 102, e.g. once the decryption occurs the confirmation is sent. In various embodiments, the authentication application 114 can instruct the display 140 of the mobile device 110 to expressly request that a user 102 confirm that he or she has read the one or more message segments by so indicating (using any suitable interface and/or command gesture with respect to mobile device 110).

In various embodiments, the authentication application 114 can instruct the barcode application 117 (e.g. via the scanner 118) to scan the one or more barcodes 144 associated with one or more message segments and by, for example, coordinating with the management application 123 of the server, the authentication application 114 can determine that at least one of the one or more barcodes 144 corresponds to material that must be reviewed and confirmed as read by the user 102 before additional material can be presented to the user. In various embodiments, more than one message segments associated with more than one barcode 144 can have to be reviewed in order for additional segments to be presented to the user 102, where each presentation may or may not require a separate barcode scan (and decoding and/or decrypting by the authentication application 114) by the scanner 118. For example, one or more message segments associated with one or more barcodes 144 can be part of a terms of service for a service, deliverable product, a purchase, or other suitable activity or engagement, and one or more of those one or more message segments can be critical portions of the terms of service, such as pricing term or legal liability terms. In various embodiments, e.g. by communicating with the management application 123 or by other suitable local or non-local mechanisms, the authentication application 114 can require the user to accept one or more of those critical terms before being able to review the rest of the message segments (e.g. additional terms of service), and a confirmation of the acceptance of each one of those critical terms can be communicated to the management application 123 by the authentication application.

In various embodiments, as shown and as alluded to above, the system 100 can include a host device, e.g. such as a server 120, that can be used in accordance with at least embodiment of the present disclosure. The server 120 can include a memory 122 configurable to include and/or including one or more relevant applications and/or mechanisms for performing one or more operations as outlined in the present disclosure, including a management application 123 that can communicate directly or indirectly with a user device, e.g. mobile device 110, and provide instructions in relation to and mechanisms enabling the decryption of an encryption mechanism 125 related to one or more message segments contained in physical delivery, e.g. postal mail 142, transmitted by a courier 141 to a user 102. In various embodiments, the management application 123 can generate and/or be configured to retrieve the encryption mechanism 125 and can instruct any suitable printing or device (not shown) to physically attach a suitable mechanism, e.g. barcode, that embodies the encryption and/or provides a vehicle to obtain discern the encryption, and by extension, subsequently decrypt it, on physical material contained in the physical delivery of postal mail 142. In various embodiments, any suitable dynamic encryption can be used to continuously update the encryption embodied in the contents (or surface, e.g. on the outside of package) of the postal mail 142. In various embodiments, the encryption mechanism 125 can include one or more ciphered texts in addition to, or in lieu of, the one or more barcodes 144, and the decryption mechanism 127 can include a suitable deciphering mechanism (e.g. a key associated with the cipher associated with the ciphered text) for deciphering the ciphered text.

Accordingly, in various embodiments, the encryption mechanism 125 is facilitated by the management application 123. For example, the encryption mechanism 125 can be any suitable barcode encryption 144 affixed to a physical delivery, package, item, product, or mail (e.g. postal mail) 142 delivered by a courier 141, where, in various embodiments, the barcode encryption 144 can be affixed to contents inside the postal mail 142 and/or the encryption mechanism 125 can be any suitable ciphered text, in addition to or in lieu of a barcode encryption, e.g. a portion of the sender message can be encrypted by ciphered text and a portion by barcode and/or within the barcode there can be additional material encrypted by ciphered text or the entirety of the message (and associated message segments) can be encrypted by ciphered text. In various embodiments, a decryption mechanism 127 (e.g. a decryption token associated with a generated or to-be-generated barcode or barcodes and/or a key to decipher cipher text) associated with a user 102 and the encryption mechanism 125 can be continuously transmitted to a user device, e.g. mobile device 110, prior to any physical delivery being scheduled or the decryption mechanism 127 can be transmitted only after an action is taken by a user 102 with the mobile device 110, e.g. scanning one or more barcodes 144 to receive a decryption token in order to decrypt the one or more barcodes and obtain (in discernible form) message contents associated therewith.

In various embodiments, the management application 123 can identify a user 102 as a recipient for one or more message contents by reviewing dynamically updated account data 124 associated with goods or services provided by the entity associated with the host device, e.g. a service provider associated with server 120. For example, when a purchase or inquiry for a purchase is made with respect to a service or product, the management application 123 can identify the user making the request for the purchase, instruct a transmission (and printing) of encrypted message contents in the form of postal mail 142 to be transmitted to a user 102 by any suitable courier 141. The message contents can be any suitable message contents, e.g. terms of service, and can be visible (e.g. via display 140 of the mobile device 110) or otherwise communicable to the user 102 via the decryption of the encryption mechanism 125 as embodied (e.g. as one or more barcodes 144) in the contents of postal mail 142. In various embodiments, since the postal mail 142 can have only the encryption mechanism and other minimal information thereon (e.g. the name and address of the user 102), if the mail 142 is lost or misappropriated, the contents cannot be read or discerned by a third party.

In various embodiments, the server 120 can include a confirmation mechanism or application 129, e.g. such as a confirmation log, which receives a confirmation from the mobile device 110 once the user has decrypted and/or reviewed one or more message contents associated with the decryption and decryption. In various embodiments, this enhances security by enabling the host to confirm that the user 102 has received the physical delivery (e.g., postal mail 142). In various embodiments, this can also serve as a mechanism for permitting the management application 123 to sequentially permit the user 102 to review various message segments and/or to require the user 102 to review one or more message segments prior to receiving any other message segments, e.g. critical portions of a terms of service.

In various embodiments, a single encryption mechanism is utilized for the entirety of the sender message and/or decryption a single message portion results in access to the entire message of the physical delivery (postal mail 142), e.g. the management application can utilize a single encryption mechanism such a single barcode or ciphered text for the entire message and/or can utilize multiple encryption mechanisms, but require that only one message segment be decrypted for the entirety of the message to be obtainable and discernible by the user 102. In various embodiments, this results in the authentication application 114 merely facilitating a single scan with the barcode application 117 and scanner 118 to obtain the entire message from the sender. In various embodiments, the entirety of the message can be reviewed after a certain number of message segments have been decrypted and/or when one or more of the critical message segments (e.g. critical portions of the terms of service) have been decrypted.

As shown, postal mail 142 can be a container with postage, where the management application 123 of the server can facilitate communication with a courier service, e.g. postal service, to receive the package, place postage thereon, and have a courier 141 facilitate deliver to the user 102 (e.g. recipient). The container can include any physical medium that can contain information in written, textual, and/or pictorial form, e.g. paper or any other suitable material for carrying such a message. The physical medium can embody one or more message segments from a sender associated with the host device, e.g. server 120, forming an entirety of the message segment. In various embodiments, management application 123 can determine that at least a portion of the message segment should be unencrypted and visible to the naked eye or ear, e.g. the name of the recipient, the address associated with the recipient, and/or the name of the sender (and/or the goods or services associated therewith). In various embodiments, the management application 123, depending on the security requirements of the particular message, can decide the scope and nature of the unencrypted information, e.g. in certain instances, the name of the recipient can be removed and only the destination address can be unencrypted, etc. In various embodiments, as discussed above, the message can include two or more encrypted portions of a plurality of terms of service, where each of the two or more encrypted portions of the plurality of terms of service are associated with a distinct barcode 144 (e.g. at least two barcodes, with each message segment associated with a distinct barcode of the at least two barcodes 144) corresponding to each of the two or more encrypted portions. In various embodiments, the encryption is based at least in part on an identity information of a recipient, e.g. the management application 123 can determine the strength, nature and scope of the encryption mechanism 125 based on the information associated with the recipient account (e.g. the sensitivity of the service and/or identity of the recipient). The identity information may be an encrypted customer ID 109 generated by the mobile device 110 and received by the management application 123 from the mobile device 110. In various embodiments, the one or more barcodes 144 can be configured for scanning by a device associated with the recipient, e.g. mobile device 110 and by the authentication application 114, barcode application 117, and scanner 118, and where each barcode is associated with a token configured for decrypting the two or more encrypted portions (e.g. as transmitted and determined by the management application 123).

Embodiments are not limited in the above manner, and the above system is merely an exemplary embodiment for implementing one or more features of the present disclosure.

Figure 2:
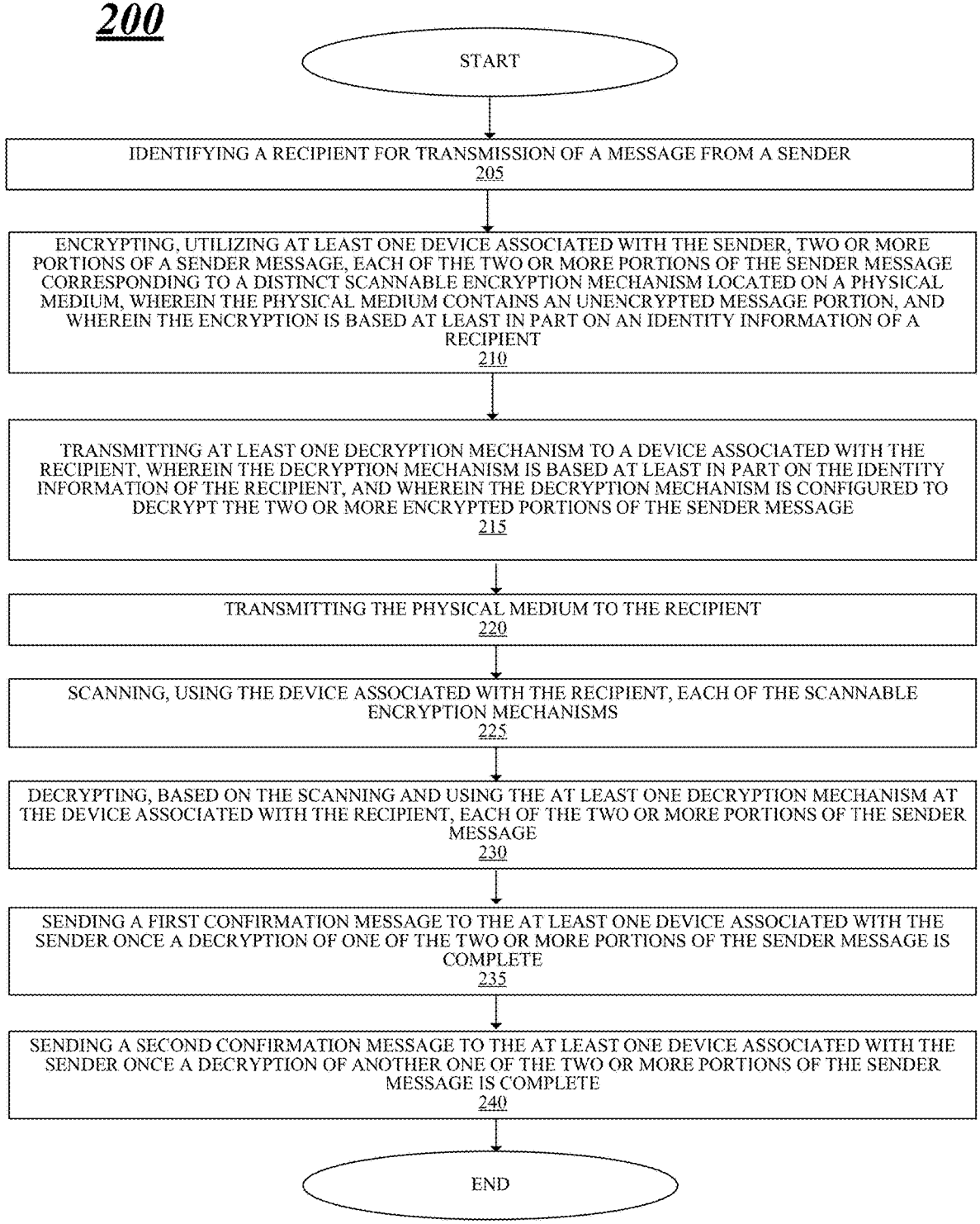
FIG. 2 illustrates an examples of one or more processing flows for encryption, decryption, and/or delivering according to at least one embodiment of the present disclosure.

FIG. 2 illustrates an example of a logic flow 200 that may be representative of some or all of the operations executed by one or more embodiments described herein. For example, the logic flow 200 may illustrate operations performed by an encryption, decryption and/or delivery system and/or components described herein, or as otherwise may be suitable, to deliver, encrypt, and/or decrypt a physical delivery, e.g. postal mail, with one or more message segments associated with encryption contained therein.

At block 205, one or more embodiments of the logic flow 200 may include at least one component as described in the present disclosure identifying a recipient for transmission of a message from a sender. In various embodiments, a suitable component as described herein can perform the identification by reviewing or continuously polling a database that is updated dynamically for order, inquiries, or changes associated with account information related to the recipient and goods or services provided by the sender.

At block 210, one or more embodiments of the logic flow 200 may include at least one component as described in the present disclosure encrypting, utilizing at least one device associated with the sender, two or more portions of a sender message, each of the two or more portions of the sender message corresponding to a distinct scannable encryption mechanism located on a physical medium, where the physical medium contains an unencrypted message portion, and where the encryption is based at least in part on an identity information of a recipient. For example, in various embodiments, an application of a server device can determine the level of encryption required based on identity information associated with the recipient, e.g. by polling account data, the nature of the service to be provided to the recipient and/or the identity of the individual recipient himself, herself, or itself can determine the type and nature of the encryption. In various embodiments, the encryption mechanism can include one or both of ciphered text and/or one or more barcodes to represent one or more of the encrypted message portion. In various embodiments, the unencrypted information can be readily discernible information that includes at least one of the identity of the recipient, the address of the recipient and/or the sender identity, address, and/or goods or services associated therewith. In various embodiments, the encrypted message segments are embodied in a physical medium contained in postal mail to be delivered the recipient, where one or more applications of a server determine the courier to deliver the physical mailing, in addition to the printing of the embodiment of the encryption mechanism with respect to the encrypted message segments of the postal mail contents. In various embodiments, each of the encrypted message segments correspond to one or more portions of a plurality of terms of service associated with the goods or services provided by the sender (e.g. associated with the server).

In various embodiments, one or more applications of the sender device, e.g. server, and/or one or more application associated with the recipient device, e.g. mobile phone of a user, can determine when one or more of the plurality of terms are associated with a critical term of the terms of service, such as a monetary term associated with goods or services offered by the sender and/or a limitation of liability in association with goods or services offered by the sender, and perform or require a performance of an additional operation as a result, e.g. requiring that those one or more terms are reviewed by the recipient (and a confirmation of the same as outlined in the rest of the flow 200 or as otherwise suitable) is transmitted to the sender (e.g. server) as a result of the nature of those critical terms of the terms of service. In various embodiments, a distinct encryption mechanism is associated with each segment corresponding to at least two of the sensitive (or other) message segments, e.g. a first barcode and/or ciphered text associated with a first of the plurality of terms of service (e.g. a first sensitive term, e.g. such as the monetary term) and a second barcode and/or ciphered text associated with a second of the plurality of terms of service (e.g. second sensitive term, e.g. such as the limitation of liability term).

At block 215, one or more embodiments of the logic flow 200 may include at least one component, as described in the present disclosure, transmitting at least one decryption mechanism to a device associated with the recipient, where the decryption mechanism is based at least in part on the identity information of the recipient, and where the decryption mechanism is configured to decrypt the two or more encrypted portions of the sender message. For example, in various embodiments, the server device can continuously transmit a decryption token and/or key (static or alternating) associated with ciphered text to a mobile device of the user, where the decryption mechanism is based on the level and type of encryption used to encrypt the message segment (e.g. which can be dependent on the identity of the user and/or sensitivity of the information to be transmitted as described herein). In various embodiments, the encryption type can be one or more encryption tokens encoded and/or associated with one or more barcodes and/or one or more ciphered texts associated with any suitable cryptographic technique. The decryption mechanism can change if multiple physical mediums (e.g. different mail deliveries with different messages) are transmitted to the recipient and/or if the encryption mechanism is dynamic and alterable by an application associated with the server as the message is transmitted.

At block 220, one or more embodiments of the logic flow 200 may include at least one component as described in the present disclosure transmitting the physical medium to the recipient, e.g. utilizing account data or other data, one or more components and/or devices associated with the sender can determine an appropriate courier service to deliver the physical mail to the recipient and/or engage a service or device to do the actual printing of the encryption mechanism with respect to the message contents contained in the mail, and where in various embodiments, the courier service actually facilitates the delivery of the postal mail (which includes the encrypted message segments) to the recipient.

At block 225, one or more embodiments of the logic flow 200 may include at least one component as described in the present disclosure scanning, using the device associated with the recipient, each of the scannable encryption mechanisms, and at block 230, one or more embodiments of the logic flow 200 may include at least one component as described in the present disclosure decrypting, based on the scanning and using the at least one decryption mechanism at the device associated with the recipient, each (or at least one) of the two or more portions of the sender message. For example, in various embodiments, a mobile device of the user may have a scanner and/or barcode application to scan the barcode and/or ciphered text, and to engage one or more other applications to utilize the transmitted decryption mechanism to decrypt (e.g. perform a decryption operation on) one or more of the encrypted message segments. In various embodiments, two or more encrypted message segments can be decrypted using either one or both of the decryption mechanism associated with a barcode or ciphered text, and performing a decryption operation in relation thereto, to obtain decrypted message segments (and display the same to the user).

In various embodiments, one or more of the decrypted message segments can be displayed on the display of the user device once decrypted (e.g. for review and/or discernment of the user). In various embodiments, a single decryption of a single message segments can result in the entirety of the message segment being unencrypted and available to the user. In various embodiments, each message segment can be required to be decrypted separately. In various embodiments, in order for the entirety of the message of the sender to be displayed or accessible by the user via the mobile device, one or more of the critical message portions (e.g. critical portions of a terms of service) must be decrypted by the user before accessing additional message segments. In various embodiments, once one or more critical terms are decrypted and/or confirmed as accepted by the user, the entirety of the rest of the message of the sender is accessible and displayable to the user.

At block 235, one or more embodiments of the logic flow 200 may include at least one component as described in the present disclosure sending a first confirmation message to the at least one device associated with the sender once a decryption of one of the two or more portions of the sender message is complete. In various embodiments, the confirmation can be sent from the mobile device to the server at any time after the message portion has been decrypted. In various embodiments, an affirmative act on the mobile device can be required of the user to confirm that he or she has reviewed the message segment. In various embodiments, review of the first message segment can be required before other message segments are decryptable, e.g. when dealing with a sensitive term of a terms of service, that terms may have to be reviewed and confirmed reviewed first before proceeding to additional terms, even if the decryption mechanism or mechanisms otherwise permit decryption of subsequent message segments.

At block 240, one or more embodiments of the logic flow 200 may include at least one component as described in the present disclosure sending a second confirmation message to the at least one device associated with the sender once a decryption of another one of the two or more portions of the sender message is complete. In various embodiments, the confirmation can be sent from the mobile device to the server at any time after the second message portion has been decrypted. In various embodiments, an affirmative act on the mobile device can be required of the user to confirm that he or she has reviewed the second message segment. In various embodiments, review of the second message segment can be required before other message segments are decryptable, e.g. when dealing with a (second) sensitive term of a terms of service, that terms may have to be reviewed and confirmed reviewed first before proceeding to additional terms, even if the decryption mechanism or mechanisms otherwise permit decryption of subsequent message segments.

Figure 3:
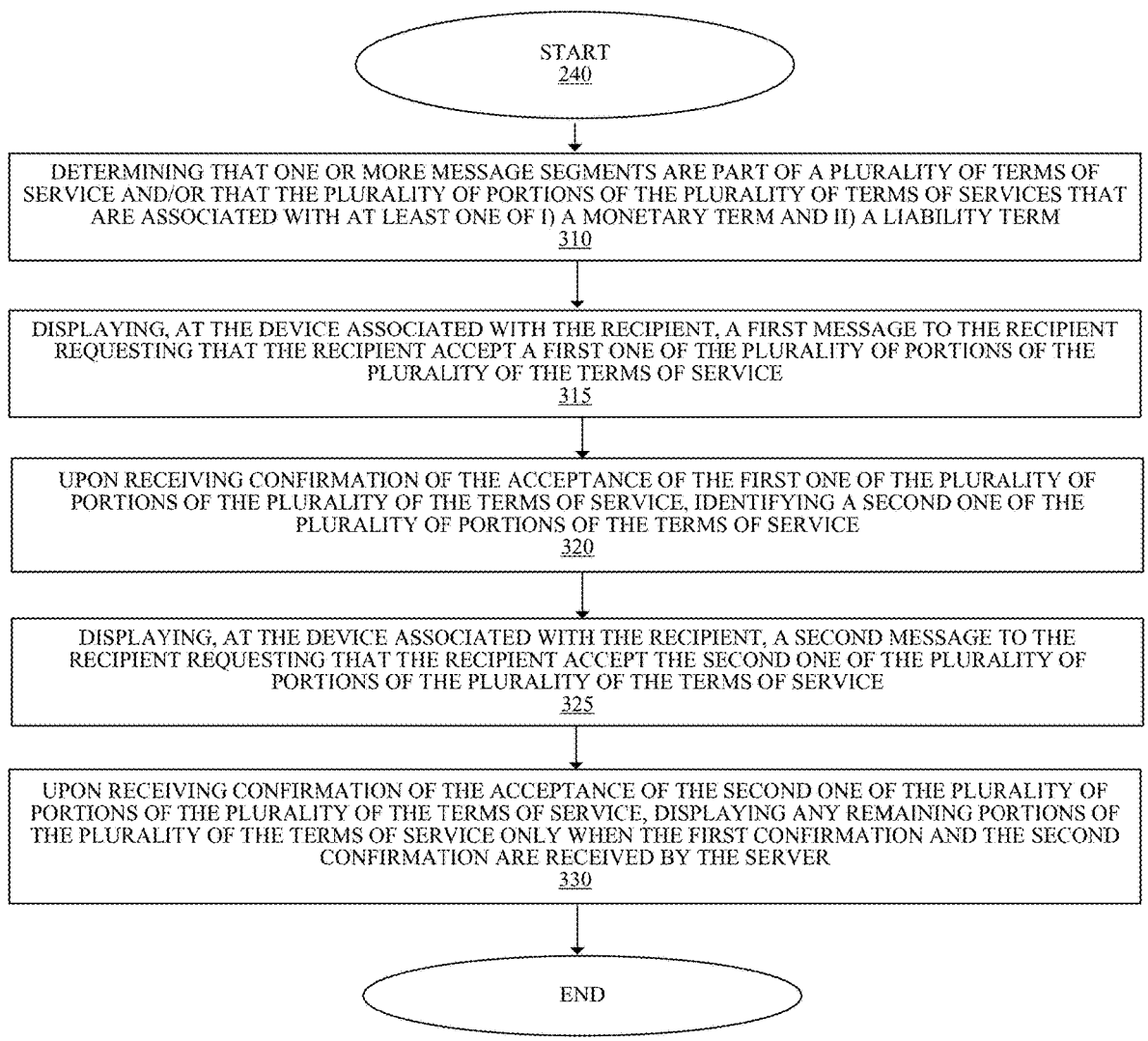
FIG. 3 illustrates an examples of one or more processing flows for encryption, decryption, and/or delivering according to at least one embodiment of the present disclosure.

FIG. 3 illustrates an example of a logic flow 300 that may be representative of some or all of the operations executed by one or more embodiments described herein. For example, the logic flow 300 may illustrate operations performed by an encryption, decryption and/or delivery system and/or components described herein, or as otherwise may be suitable, to deliver, encrypt, and/or decrypt a physical delivery, e.g. postal mail, with one or more message segments associated with encryption contained therein.

In various embodiments, the logic flow 300 can begin at block 240 of logic flow 200 and/or include at least one operation with respect to logic flow 200 before commencing any additional operations. At block 310, one or more embodiments of the logic flow 300 may include at least one component as described in the present disclosure determining that one or more message segments are part of a plurality of terms of service and/or that the plurality of portions of the plurality of terms of services that are associated with at least one of i) a monetary term and ii) a liability term. For example, an application associated with a mobile device of a user (e.g. recipient) may communicate with an application of a server associated with a sender, and upon successfully initiating a decryption operation, the server application can communicate that at critical term of a terms of service is associated with the overall message segment, e.g. a monetary term and/or a liability term.

At block 315, one or more embodiments of the logic flow 300 may include at least one component as described in the present disclosure displaying, at the device associated with the recipient, a first message to the recipient requesting that the recipient accept the first one of the plurality of portions of the plurality of the terms of service. For example, the first critical term of the terms of service can be presented to the user for acceptance via the display of the mobile device, and subsequent decryption or access of additional message segments can be contingent on the user affirmatively accepting that first critical term of service on the display.

At block 320, one or more embodiments of the logic flow 300 may include at least one component as described in the present disclosure, upon receiving confirmation of the acceptance of the first one of the plurality of portions of the plurality of the terms of service, transmitting the first confirmation and/or identifying a second one of the plurality of portions of the plurality of terms of service, e.g. once the user performs the affirmative act on the display, an application of the mobile device communicates the same to the server, and the server can indicate that a second portion of the terms of service is critical and must be accepted, e.g. the other of the limitation of liability and/or monetary term.

At block 325, one or more embodiments of the logic flow 300 may include at least one component as described in the present disclosure displaying, at the device associated with the recipient, a second message to the recipient requesting that the recipient accept the second one of the plurality of portions of the plurality of the terms of service. For example, the second critical term of the terms of service can be presented to the user for acceptance via the display of the mobile device, and subsequent decryption or access of additional message segments can be contingent on the user affirmatively accepting that second critical term of service on the display At block 330, one or more embodiments of the logic flow 300 may include at least one component as described in the present disclosure displaying any remaining portions of the plurality of the terms of service only when the first confirmation and the second confirmation are received by the service, e.g. once the server receives confirmation that that critical terms of the terms of service have been accepted by the user, one or more applications of the mobile device can decrypt the remaining message segments and/or access the entirety of the remaining message segments automatically once the decryption occurs.

Figure 4:
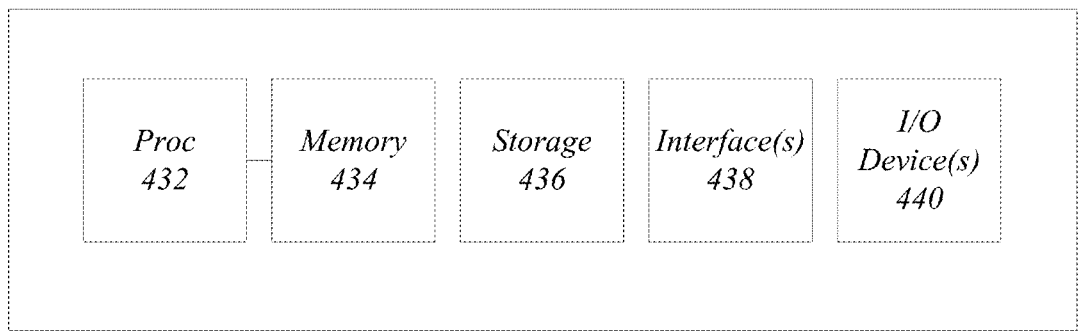
FIG. 4 illustrates a machine learning system according to an embodiment of the present disclosure

FIG. 4 illustrates an example of an encoding, decoding and/or message transmission system 406. The encoding, decoding and/or message transmission system 406 includes one or more processor(s) 432, memory 434, storage 436, one or more interface(s) 438, and one or more I/O device(s) 440.

In embodiments, the encoding, decoding and/or message transmission system 406 may be a processing system that includes one or more servers or computing devices that are interconnected via one or more network links, e.g., wired, wireless, fiber, etc. In some instances, the system 406 may be a distributed computing system. Each of the servers may include one or more processor(s) 432, which may include one or more processing cores to process information and data. Moreover, the one or more processors 432 can include one or more processing devices, such as a microprocessor manufactured by Intel™, AMD™, or any of various processors. The disclosed embodiments are not limited to any type of processor(s).

Memory 434 can include one or more memory (volatile or non-volatile) devices configured to store instructions used by the one or more processors 432 to perform one or more operations consistent with the disclosed embodiments. For example, memory 434 can be configured with one or more software instructions, such as programs that can perform one or more operations when executed by the one or more processors 432.

The disclosed embodiments are not limited to separate programs or computers configured to perform dedicated tasks. For example, memory 434 can include a single program that performs the operations or could comprise multiple programs. Memory 434 can also store data that can reflect any type of information in any format that the system can use to perform operations consistent with the disclosed embodiments.

In embodiments, the system 406 may include one or more storage devices 436. The storage devices 436 may include HDDs, flash memory devices, optical storage devices, floppy storage devices, etc. In some instances, the storage devices 436 may include cloud-based storage devices that may be accessed via a network interface. In some embodiments, the storage 436 may be configured to store one or more databases and/or as a distributed database system to store information and data. Databases can include one or more memory devices that store information and are accessed and/or managed through the system 406. By way of example, databases can include Oracle™ databases, Sybase™ databases, or other relational databases or non-relational databases, such as Hadoop sequence files, HBase, or Cassandra. The databases or other files can include, for example, data and information related to the source and destination of a network request, the data contained in the request, transaction information, etc. Systems and methods of disclosed embodiments, however, are not limited to separate databases. In one aspect, system 406 can include databases located remotely from other system 406 devices. The databases can include computing components (e.g., database management system, database server, etc.) configured to receive and process requests for data stored in memory devices of databases and to provide data from databases.

Figure 5:
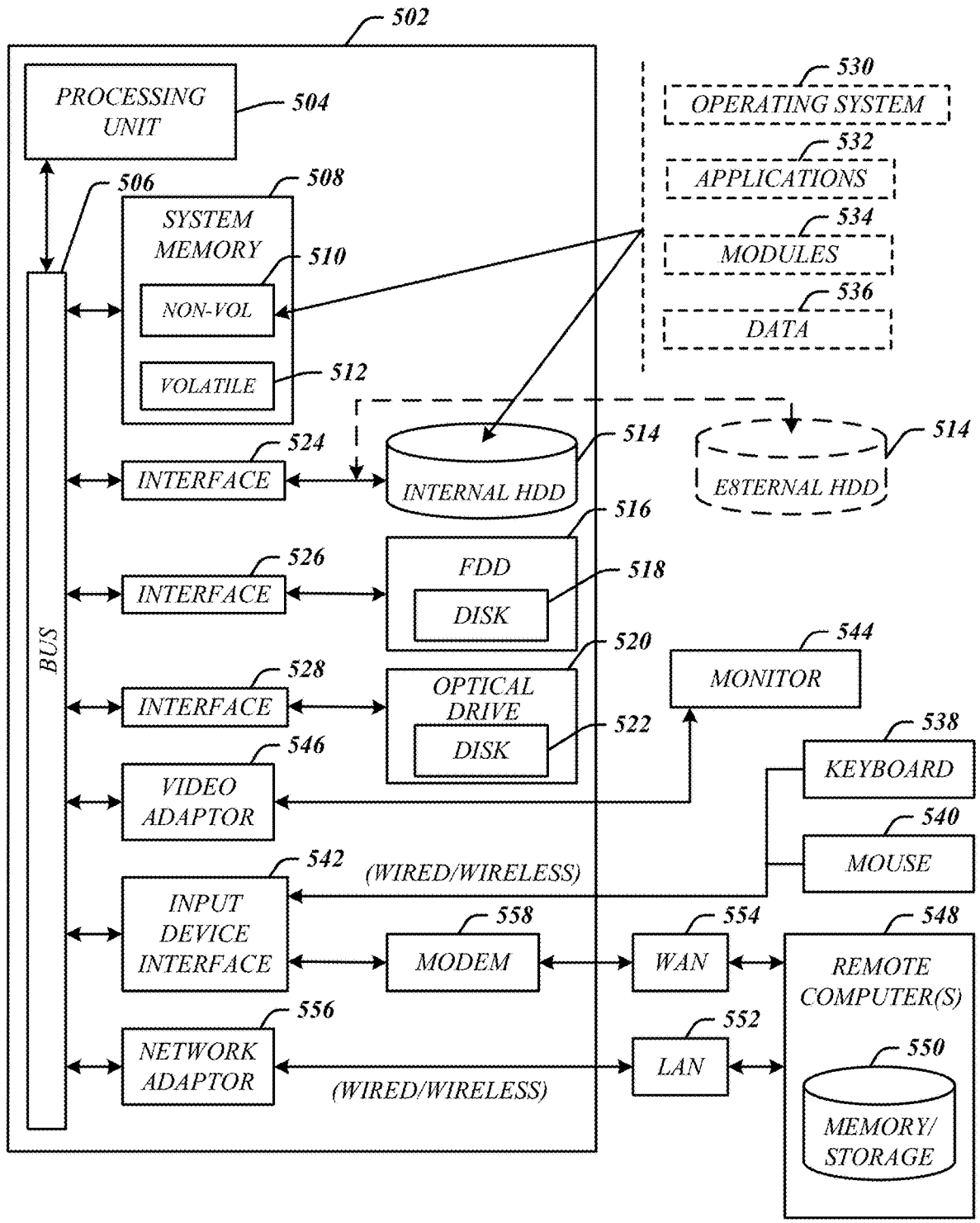
FIG. 5 illustrates an embodiment of a computing architecture useful with at least one embodiment of the present disclosure.

FIG. 5 illustrates an embodiment of an exemplary computing architecture 500 suitable for implementing one or more embodiments as previously described. In one embodiment, the computing architecture 500 may include or be implemented as part of system 100.

As used in this application, the terms "system" and "component" are intended to refer to a computer-related entity, either hardware, a combination of hardware and software, software, or software in execution, examples of which are provided by the exemplary computing architecture 500. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 500 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 500.

As shown in FIG. 5, the computing architecture 500 includes a processing unit 504, a system memory 506 and a system bus 508. The processing unit 504 can be any of various commercially available processors.

The system bus 508 provides an interface for system components including, but not limited to, the system memory 506 to the processing unit 504. The system bus 508 can be any of several types of bus structure that may further interconnect to a memory bus (with or without a memory controller), a peripheral bus, and a local bus using any of a variety of commercially available bus architectures. Interface adapters may connect to the system bus 508 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 500 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 506 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 5, the system memory 506 can include non-volatile memory 510 and/or volatile memory 512. A basic input/output system (BIOS) can be stored in the non-volatile memory 510.

The computer 502 may include various types of computer-readable storage media in the form of one or more lower speed memory units, including an internal (or external) hard disk drive (HDD) 514, a magnetic floppy disk drive (FDD) 516 to read from or write to a removable magnetic disk 518, and an optical disk drive 520 to read from or write to a removable optical disk 522 (e.g., a CD-ROM or DVD). The HDD 514, FDD 516 and optical disk drive 520 can be connected to the system bus 508 by an HDD interface 524, an FDD interface 526 and an optical drive interface 528, respectively. The HDD interface 524 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 510, 512, including an operating system 530, one or more application programs 532, other program modules 534, and program data 536. In one embodiment, the one or more application programs 532, other program modules 534, and program data 536 can include, for example, the various applications and/or components of the system 500.

A user can enter commands and information into the computer 502 through one or more wire/wireless input devices, for example, a keyboard 538 and a pointing device, such as a mouse 540. Other input devices may include microphones, infra-red (IR) remote controls, radio-frequency (RF) remote controls, gamepads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 504 through an input device interface 542 that is coupled to the system bus 508 but can be connected by other interfaces such as a parallel port, IEEE 1394 serial port, a game port, a USB port, an IR interface, and so forth.

A monitor 544 or other type of display device is also connected to the system bus 508 via an interface, such as a video adaptor 546. The monitor 544 may be internal or external to the computer 502. In addition to the monitor 544, a computer typically includes other peripheral output devices, such as speakers, printers, and so forth.

The computer 502 may operate in a networked environment using logical connections via wire and/or wireless communications to one or more remote computers, such as a remote computer 548. The remote computer 548 can be a workstation, a server computer, a router, a personal computer, portable computer, microprocessor-based entertainment appliance, a peer device or other common network node, and typically includes many or all the elements described relative to the computer 502, although, for purposes of brevity, only a memory/storage device 550 is illustrated. The logical connections depicted include wire/wireless connectivity to a local area network (LAN) 552 and/or larger networks, for example, a wide area network (WAN) 554. Such LAN and WAN networking environments are commonplace in offices and companies, and facilitate enterprise-wide computer networks, such as intranets, all of which may connect to a global communications network, for example, the Internet.

When used in a LAN networking environment, the computer 502 is connected to the LAN 552 through a wire and/or wireless communication network interface or adaptor 556. The adaptor 556 can facilitate wire and/or wireless communications to the LAN 552, which may also include a wireless access point disposed thereon for communicating with the wireless functionality of the adaptor 556.

When used in a WAN networking environment, the computer 502 can include a modem 558, or is connected to a communications server on the WAN 554 or has other means for establishing communications over the WAN 554, such as by way of the Internet. The modem 558, which can be internal or external and a wire and/or wireless device, connects to the system bus 508 via the input device interface 542. In a networked environment, program modules depicted relative to the computer 502, or portions thereof, can be stored in the remote memory/storage device 550. It will be appreciated that the network connections shown are exemplary and other means of establishing a communications link between the computers can be used.

The computer 502 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.118 (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of the devices as previously described with reference to FIGS. 1-5 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Figure 6:
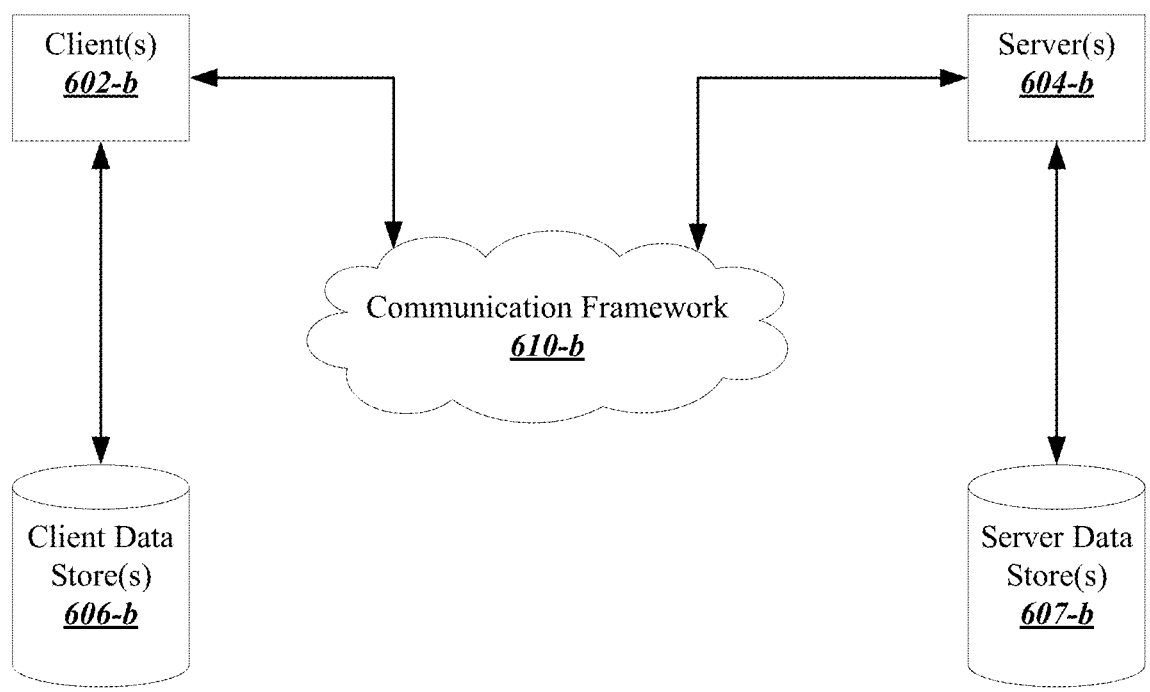
FIG. 6 illustrates an embodiment of a communications architecture useful with at least one embodiment of the present disclosure.

FIG. 6 is a block diagram depicting an exemplary communications architecture 600 suitable for implementing one or more embodiments as previously described. The communications architecture 600 includes various common communications elements, such as a transmitter, receiver, transceiver, radio, network interface, baseband processor, antenna, amplifiers, filters, power supplies, and so forth. The embodiments, however, are not limited to implementation by the communications architecture 600, which may be consistent with system 100.

As shown in FIG. 6, the communications architecture 600 includes one or more clients 602 and servers 604. The servers 604 may implement the server device and/or system 406. The clients 602 and the servers 604 are operatively connected to one or more respective client data stores 606 and server data stores 607 that can be employed to store information local to the respective clients 602 and servers 604, such as cookies and/or associated contextual information.

The clients 602 and the servers 604 may communicate information between each other using a communication framework 610. The communications framework 610 may implement any well-known communications techniques and protocols. The communications framework 610 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 610 may implement various network interfaces arranged to accept, communicate, and connect to a communications network. A network interface may be regarded as a specialized form of an input/output (I/O) interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 702.7a-x network interfaces, IEEE 702.16 network interfaces, IEEE 702.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 602 and the servers 604. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

One or more embodiments also relate to apparatus or systems for performing these operations. This apparatus may be specially constructed for the required purpose and may be selectively activated or reconfigured by a computer program stored in the computer. The procedures presented herein are not inherently related to a particular computer or other apparatus. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A method comprising:
    identifying a recipient for transmission of a message from a sender;
    encrypting, utilizing a sender device associated with the sender, two or more portions of a sender message, each of the two or more portions of the sender message corresponding to a distinct scannable encryption mechanism located on a physical medium, wherein the physical medium contains an unencrypted message portion, and wherein the encryption is based at least in part on an identity information of a recipient;
    transmitting a first decryption mechanism to a recipient device associated with the recipient, wherein the first decryption mechanism is based at least in part on the identity information of the recipient, and wherein the first decryption mechanism is configured to decrypt a first portion of the two or more encrypted portions of the sender message;
    transmitting the physical medium to the recipient;
    scanning, using the recipient device, each of the scannable encryption mechanisms;
    decrypting, based on the scanning and using the first decryption mechanism at the recipient device, the first portion of the two or more portions of the sender message, wherein the first portion of the sender message comprises a first one of a plurality of portions of a plurality of terms of service;
    sending, by the recipient device to the sender device, a first confirmation message based on the decryption of the first portion of the two or more portions of the sender message;
    receiving acceptance of the first portion of the sender message displayed on the recipient device;
    sending, by the recipient device to the sender device, a first acceptance message reflecting the acceptance of the first portion of the sender message;
    receiving, by the recipient device based on the sender device receiving the first acceptance message, a second decryption mechanism and an indication from the sender device permitting decryption of a second portion of the two or more portions of the sender message;

decrypting, by the recipient device based on the indication received from the sender device permitting decryption of the second portion, the second portion of the two or more portions of the sender message using the second decryption mechanism, wherein the second portion of the sender message comprises a second one of the plurality of portions of the plurality of terms of service; and sending, by the recipient device to the sender device, a second confirmation message based on the decryption of the second portion of the two or more portions of the sender message.

2. The method of claim 1, wherein the distinct scannable encryption mechanisms comprise two or more barcodes, wherein the sender device includes at least one server, and wherein the sending of the first confirmation message and the sending of the second confirmation message is to the at least one server.

3. The method of claim 2, wherein the physical medium is a portion of a physical mailing associated with a postal service.

4. The method according to claim 3, wherein the plurality of terms of service are associated with a provision of goods or services.

5. The method according to claim 4, the method further comprising:
determining a plurality of portions of the plurality of terms of services that are associated with at least one of i) a monetary term and ii) a liability term.

6. The method according to claim 5, wherein the first one of the plurality of portions of the plurality of terms of service is a portion associated with the monetary term, and wherein the second one of the plurality of portions of the plurality of terms of service is associated with the liability term.

7. The method according to claim 6, further comprising:
displaying, at the recipient device, the first portion of the sender message;
displaying, at the recipient device, a first message to the recipient requesting that the recipient accept the first one of the plurality of portions of the plurality of the terms of service as a condition to decrypting and viewing the second one of the plurality of portions of the plurality of the terms of service; and
upon receiving acceptance of the first one of the plurality of portions of the plurality of the terms of service at the recipient device, displaying, at the recipient device:
the second one of the plurality of portions of the plurality of the terms of service; and
a second message requesting that the recipient accept the second one of the plurality of portions of the plurality of the terms of service as a condition to decrypting and viewing the remaining plurality of portions of the plurality of the terms of service.

8. The method according to claim 7, further comprising:
receiving, by the recipient device, confirmation of the acceptance of the second one of the plurality of portions of the plurality of the terms of service;
transmitting a second acceptance message reflecting the acceptance of the second one of the plurality of portions of the plurality of terms of service to the server; and
displaying the remaining plurality of portions of the plurality of the terms of service when the first confirmation and the second confirmation are received by the server.

9. The method according to claim 3, wherein the decrypting of each of the two or more portions of the sender message:
receiving, at the device associated with the recipient, an unencrypted entirety of the sender message.

10. The method according to claim 3, wherein the encrypting, utilizing at least one device associated with the sender, the two or more portions of the sender message comprises:
embedding each barcode of the two or more portions of the sender message with a token.

11. The method according to claim 10, wherein the scanning, using the recipient device, each of the scannable encryption mechanisms comprises scanning each barcode associated with each of the two or more portions of the sender message, and wherein the decrypting of each of the two or more portions of the sender message comprises:
performing a decryption operation with respect to the token associated with each barcode; and
receiving, at the device associated with the recipient and once the decryption operation takes place, a cipher for deciphering one or more ciphered texts for each of the two or more portions of the sender message.

12. The method according to claim 1, wherein the encrypting, utilizing at least one device associated with the sender, the two or more portions of the sender message comprises:
utilizing one or more ciphered texts for each of the two or more portions of the sender message.

13. The method according to claim 12, wherein the decrypting of each of the two or more portions of the sender message comprises:
utilizing, at the device associated with the recipient, the cipher to de-cipher the one or more ciphered texts for each of the two or more portions of the sender message.

14. An apparatus, comprising:
a processor circuit; and
a memory storing instructions which when executed by the processor circuit, cause the processor circuit to:
transmit to a device of a recipient a first decryption mechanism, wherein the first decryption mechanism is based at least in part on an identity information of the recipient, and wherein the first decryption mechanism is configured to decrypt, based on a scanning operation at the device of the recipient, a first scannable encryption mechanism of two or more distinct scannable encryption mechanisms associated with two or more portions of a sender message, wherein the first decryption mechanism is configured to decrypt a first portion of the two or more encrypted portions of the sender message, and wherein each of the two or more scannable encryption mechanisms are located on a surface of a portion of a physical mailing associated with a postal service, wherein the surface of the portion of the physical mailing has both the two or more scannable encryption mechanisms and an unencrypted message portion, wherein the first portion of the sender message comprises a first one of a plurality of portions of a plurality of terms of service;
receive a first confirmation message based on the decryption of the first portion of the two or more portions of the sender message;
receive a first acceptance message specifying acceptance of the first portion of the sender message displayed on the device;

transmit, to the device based on the receipt of the first confirmation message and the first acceptance message, a second decryption mechanism and an indication permitting decryption of a second portion of the two or more portions of the sender message, wherein the second portion of the sender message comprises a second one of the plurality of portions of the plurality of terms of service; and receive a second confirmation message based on the decryption of the second portion of the sender message using the second decryption mechanism.

15. The apparatus of claim 14, wherein each of the scannable encryption mechanisms includes at least one barcode, the memory storing instructions which when executed by the processor circuit, cause the processor circuit to:

receive a second acceptance message specifying acceptance of the second portion of the sender message displayed on the device; and transmit, to the device based on the receipt of the second confirmation message and the second acceptance message, an indication permitting decryption and display of a third portion of the two or more portions of the sender message.

16. The apparatus of claim 15, wherein the sender message includes a plurality of terms of service associated with a provision of goods or services, and wherein first portion of the sender message is associated with a first term of service of the plurality of terms of service, and wherein the second portion of the sender message is associated with a second term of service of the plurality of terms of service.

17. The apparatus of claim 16, wherein the first term of service is associated with a monetary term, and wherein the second term of service is associated with a liability term.

18. A non-transitory computer-readable storage medium storing computer-readable program code executable by a processor to cause the processor to:

transmit to a device of a recipient a first decryption mechanism, wherein the first decryption mechanism is based at least in part on an identity information of the recipient, and wherein the first decryption mechanism is configured to decrypt, based on a scanning operation at the device of the recipient, a first scannable encryption mechanism of two or more distinct scannable encryption mechanisms associated with two or more portions of a sender message, wherein the first decryption mechanism is configured to decrypt a first portion of the two or more encrypted portions of the sender message, and wherein each of the two or more scannable encryption mechanisms are located on a surface of a portion of a physical mailing associated with a postal service, wherein the surface of the portion of the physical mailing has both the two or more scannable encryption mechanisms and an unencrypted message portion, wherein the first portion of the sender message comprises a first one of a plurality of portions of a plurality of terms of service;

receive a first confirmation message based on the decryption of the first portion of the two or more portions of the sender message;

receive a first acceptance message specifying acceptance of the first portion of the sender message displayed on the device;

transmit, to the device based on the receipt of the first confirmation message and the first acceptance message, a second decryption mechanism and an indication permitting decryption of a second portion of the two or more portions of the sender message, wherein the second portion of the sender message comprises a second one of the plurality of portions of the plurality of terms of service; and receive a second confirmation message based on the decryption of the second portion of the sender message using the second decryption mechanism.

\* \* \* \* \*